United States Patent
Shin et al.

(10) Patent No.: US 11,305,760 B2
(45) Date of Patent: Apr. 19, 2022

(54) APPARATUS AND METHOD FOR CONTROLLING AVOIDANCE OF EMERGENCY VEHICLE, AND VEHICLE SYSTEM

(71) Applicants: HYUNDAI MOTOR COMPANY, Seoul (KR); KIA MOTORS CORPORATION, Seoul (KR)

(72) Inventors: Dong Jin Shin, Suwon-si (KR); Myeong Gyu Jeong, Seoul (KR); Dong Youl Lee, Seoul (KR); Jae Am Seo, Seongnam-si (KR); Hyeok Sang Jeong, Suncheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 184 days.

(21) Appl. No.: 16/673,344

(22) Filed: Nov. 4, 2019

(65) Prior Publication Data
US 2020/0156629 A1    May 21, 2020

(30) Foreign Application Priority Data
Nov. 16, 2018    (KR) .................. 10-2018-0142002

(51) Int. Cl.
*B60W 30/09*    (2012.01)
*B60W 50/14*    (2020.01)
(Continued)

(52) U.S. Cl.
CPC ...... *B60W 30/09* (2013.01); *B60W 30/18163* (2013.01); *B60W 40/04* (2013.01);
(Continued)

(58) Field of Classification Search
CPC .......... B60W 30/09; B60W 30/18163; B60W 50/14; B60W 40/04; B60W 2554/801;
(Continued)

(56) References Cited

U.S. PATENT DOCUMENTS 6,326,903 B1 * 12/2001 Gross .................. G08G 1/087
340/902
2003/0169181 A1 * 9/2003 Taylor ................ G08G 1/0965
340/902
(Continued)

*Primary Examiner* — Peter D Nolan
*Assistant Examiner* — Ashley L Redhead, Jr.
(74) *Attorney, Agent, or Firm* — Morgan, Lewis & Bockius LLP

(57) ABSTRACT

An apparatus and a method for controlling the avoidance of an emergency vehicle, and a vehicle system are provided. The apparatus includes a communication device to receive traveling data from vehicles traveling in a specific section on an expected traveling path of the emergency vehicle, a determination device to identify locations of the vehicles from the received traveling data and to determine at least one control vehicle based on the identified locations of the vehicles, and a controller to determine an avoidance control time point of each control vehicle based on an expected approach time of the emergency vehicle to the control vehicle, and to transmit a control message to the control vehicle based on the avoidance control time point of the control vehicle.

22 Claims, 13 Drawing Sheets

(51) Int. Cl.
  *B60W 40/04* (2006.01)
  *B60W 30/18* (2012.01)
  *G08G 1/16* (2006.01)

(52) U.S. Cl.
  CPC ............ *B60W 50/14* (2013.01); *G08G 1/166* (2013.01); *B60W 2554/801* (2020.02); *B60W 2556/65* (2020.02)

(58) Field of Classification Search
  CPC .. B60W 2556/65; G08G 1/166; G08G 1/0965
  See application file for complete search history.

(56) References Cited

U.S. PATENT DOCUMENTS

| | | | | |
|---|---|---|---|---|
| 2018/0178781 | A1* | 6/2018 | Funk | B60W 10/20 |
| 2018/0334161 | A1* | 11/2018 | Mizuno | B60W 50/16 |
| 2019/0187719 | A1* | 6/2019 | El-Khatib | G08G 1/0965 |
| 2020/0193549 | A1* | 6/2020 | Pedersen | G05D 1/0088 |

* cited by examiner

APPARATUS AND METHOD FOR CONTROLLING AVOIDANCE OF EMERGENCY VEHICLE, AND VEHICLE SYSTEM

CROSS-REFERENCE TO RELATED APPLICATION

This application is claims the benefit of priority to Korean Patent Application No. 10-2018-0142002, filed in the Korean Intellectual Property Office on Nov. 16, 2018, the entire contents of which are incorporated herein by reference.

TECHNICAL FIELD

The present disclosure relates to an apparatus and a method for controlling the avoidance of an emergency vehicle, and a vehicle system.

BACKGROUND

The time taken until an emergency vehicle, such as a fire truck or an ambulance, arrives at the destination is related to saving the life of the person. Accordingly, to reduce the time taken until the emergency vehicle arrives at the destination, it is necessary for surrounding vehicles to move to the right side or the left side of a road to ensure a movement path of the emergency vehicle.

Until now, the emergency vehicle has alerted the location thereof to the surrounding vehicles by ringing sirens or horns. In this case, drivers of the surrounding vehicles hear the siren or the horn and make a passage for the emergency vehicle by moving to the road line or to a next lane.

However, a driver may hear the sirens and may slowly react to the sires. In some cases, a driver may not perceive the sirens In addition, since drivers move the vehicles in various directions, the vehicles occasionally fail to move rapidly.

SUMMARY

The present disclosure has been made to solve the above-mentioned problems occurring in the prior art while advantages achieved by the prior art are maintained intact.

An aspect of the present disclosure provides an apparatus and a method for controlling the avoidance of an emergency vehicle, and a vehicle system, capable of determining an avoidance control time point and an avoidance direction through wireless communication with vehicles on a traveling path of the emergency vehicle to perform the avoidance control based on the avoidance control time point and the avoidance direction before the emergency vehicle approaches, thereby rapidly ensuring the movement path of the emergency vehicle.

Another aspect of the present disclosure provides an apparatus and a method for controlling the avoidance of an emergency vehicle, and a vehicle system, capable of determining an avoidance control time point and an avoidance direction based on an expected approach time of the emergency vehicle to each vehicle, a rotation direction of the emergency vehicle, and a road situation to perform the avoidance control for each vehicle, thereby effectively controlling the avoidance of the emergency vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling avoidance for an emergency vehicle, includes a communication device to receive traveling data from vehicles traveling in a specific section on an expected traveling path of the emergency vehicle, a determination device to identify locations of the vehicles from the received traveling data and to determine at least one control vehicle based on the identified locations of the vehicles, and a controller to determine an avoidance control time point of each control vehicle based on an expected approach time of the emergency vehicle to the control vehicle, and to transmit a control message to the control vehicle based on the avoidance control time point of the control vehicle.

The determination device determines, as the control vehicle, a vehicle on the same lane as a lane of the emergency vehicle by comparing a traveling lane location of the emergency vehicle with a traveling lane location of each vehicle.

The determination device determines, as the control vehicle, a vehicle located in a rotation direction of the emergency vehicle by comparing a location of the emergency vehicle with a location of the respective vehicles.

The determination device determines, as the control vehicle, a vehicle, a traveling lane of which is to be changed to a traveling lane of the emergency vehicle, by determining a location and an expected traveling path of each vehicle.

The controller calculates the expected approach time of the emergency vehicle to the control vehicle, based on a distance between the emergency vehicle and the control vehicle, a speed of the emergency vehicle, or the maximum speed limit of a relevant road.

The controller generates a control message for each step based on the expected approach time of the emergency vehicle.

The controller generates an avoidance and warning message when the expected approach time of the emergency vehicle is less than a first time, generates an avoidance message when the expected approach time of the emergency vehicle is the first time or more and less than a second time, and generates a warning message when the expected approach time of the emergency vehicle is the second time or more.

The controller determines an avoidance direction of the control vehicle and whether to change a lane of the control vehicle, and generates the control message for the control vehicle, based on the determined avoidance direction and the determination of whether to change the lane of the control vehicle.

The controller determines the avoidance direction of the control vehicle, based on the rotation direction or a movement direction of the emergency vehicle.

The controller determines whether to change the lane of the control vehicle, based on a traffic situation of a road.

The controller determines to change a traveling lane of the control vehicle when a traveling speed of the control vehicle is a reference speed or more, and determines to move the control vehicle within the traveling lane when the traveling speed of the control vehicle is less than the reference speed.

The controller determines a lane, which is to be changed, of the control vehicle, based on locations of vehicles on left and right lanes of the control vehicle, when the traveling speed of the control vehicle is the reference speed or more.

The communication device receives traveling data of the emergency vehicle from a management server which provides the traveling data of the emergency vehicle, and the determination device determines the expected traveling path of the emergency vehicle based on the traveling data of the emergency vehicle.

The communication device receives the traveling data in real time or in a specific cycle.

According to another aspect of the present disclosure, a method for controlling avoidance of an emergency vehicle includes receiving traveling data from vehicles traveling in a specific section on an expected traveling path of the emergency vehicle, identifying locations of the vehicles from the received traveling data and determining at least one control vehicle based on the identified locations of the vehicles, and determining an avoidance control time point of each control vehicle based on an expected approach time of the emergency vehicle to the control vehicle, and transmitting a control message to the control vehicle based on the avoidance control time point of the control vehicle.

According to another aspect of the present disclosure, a vehicle system includes an emergency vehicle, a management server to provide traveling data of the emergency vehicle, vehicles traveling in a specific section on an expected traveling path of the emergency vehicle, and an emergency vehicle avoidance control apparatus to determine at least one control vehicle based on locations of the vehicles which are identified based on traveling data of the vehicles, to determine an avoidance control time point of each control vehicle based on an expected approach time of the emergency vehicle to the control vehicle, and to transmit a control message to the control vehicle based on the determined avoidance control time point of the control vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to accompanying drawings. In the following description, the same reference numbers will be assigned to the same components even though the components are illustrated in different drawings. In addition, in the following description of an embodiment of the present disclosure, a detailed description of well-known features or functions will be ruled out in order not to unnecessarily obscure the gist of the present disclosure.

In describing components in embodiments of the present disclosure, the terms $1^{st}$, $2^{nd}$, first, second, A, B, (a), (b), and the like may be used herein. The terms are used only to distinguish relevant components from other components, and the nature, the order, or the sequence of the relevant components is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Figure 1:
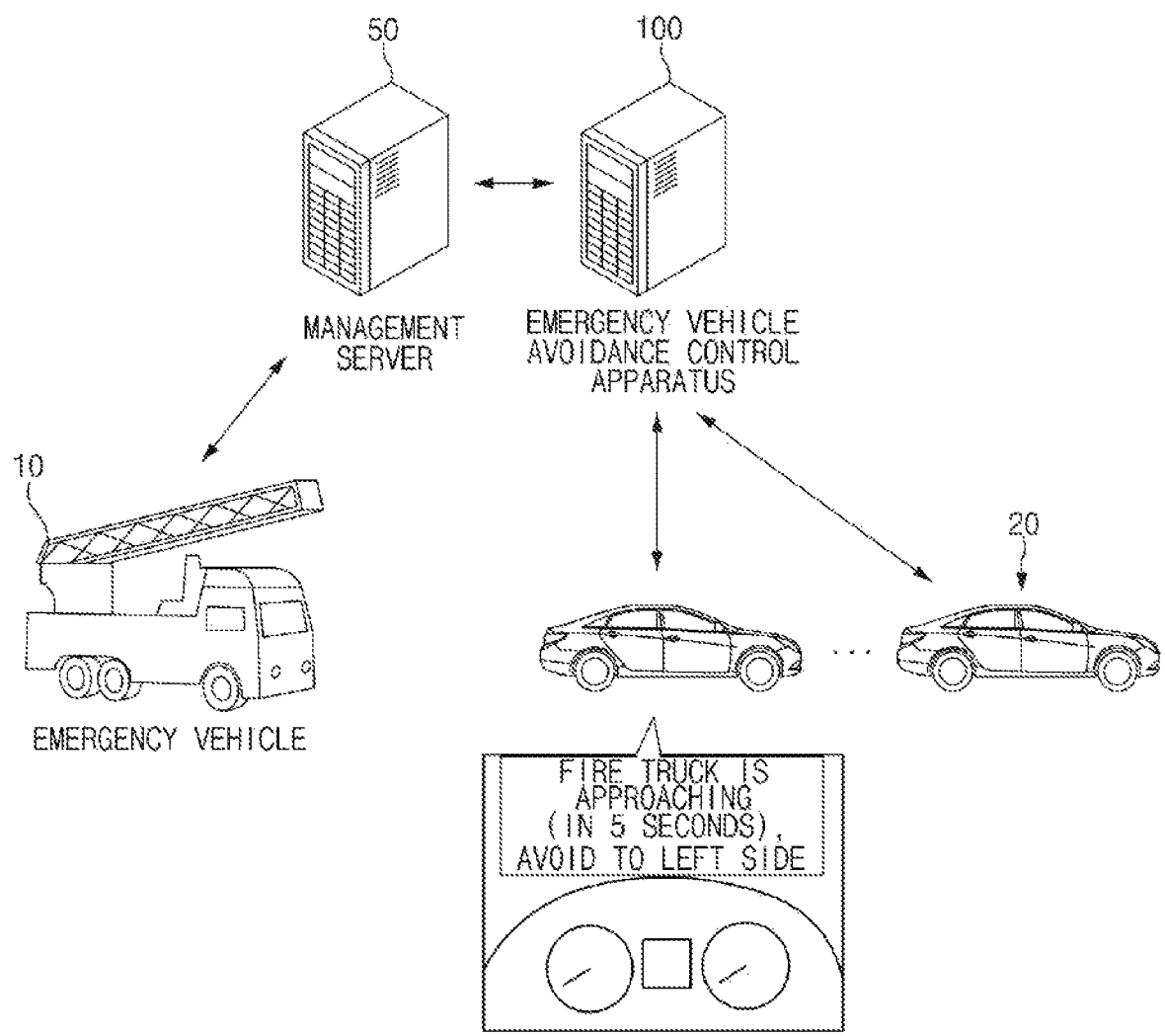
FIG. 1 is a view illustrating a vehicle system to which an apparatus for controlling the avoidance of an emergency vehicle is applied, according to an embodiment of the present disclosure.

FIG. 1 is a view illustrating a vehicle system to which an apparatus (hereinafter, referred to as an "emergency vehicle avoidance control apparatus") for controlling the avoidance of an emergency vehicle is applied, according to an embodiment of the present disclosure.

Referring to FIG. 1, according to the present disclosure, the vehicle system may include an emergency vehicle 10, vehicles 20 traveling in a specific section on an expected traveling path of the emergency vehicle 10, a management server 50, and the emergency vehicle avoidance control apparatus 100.

The emergency vehicle 10 may be a fire truck, an ambulance, or the like.

The management server 50 collects and manages traveling data (hereinafter, referred to as "first traveling data") received from the emergency vehicle 10 in real time or in the unit of a specific time. The management server 50 may provide the collected first traveling data to the emergency vehicle avoidance control apparatus 100 in real time or in the unit of a specific time.

In this case, the first traveling data may include at least one of the location, a traveling lane, an expected traveling path, and a speed of the emergency vehicle 10. In addition, the first traveling data may further include information for detecting the traveling situation of the emergency vehicle 10.

The emergency vehicle avoidance control apparatus 100 receives the first traveling data from the management server 50, determines the expected traveling path of the emergency vehicle 10 based on the received first traveling data, makes wireless communication with the vehicles 20 traveling in a specific section on the expected traveling path, and receives traveling data (hereinafter, referred to as "second traveling data") from each vehicle 20.

In this case, the second traveling data may include at least one of the location, a traveling lane, an expected traveling path, and a speed of each vehicle 20. In addition, the second traveling data may further include information for detecting the traveling situation of each vehicle 20.

At this case, the emergency vehicle avoidance control apparatus 100 identify the location of each vehicle 20 based on the received second traveling data, determines at least one control vehicle based on the identified location of each vehicle 20, and transmits a control message to each control vehicle, thereby controlling the avoidance of the emergency vehicle 10.

In this case, the emergency vehicle avoidance control apparatus 100 determines a time point (hereinafter, referred to as an "avoidance control time point") for controlling each control vehicle to avoid the emergency vehicle 10, based on an expected approach time of the emergency vehicle 10 to each control vehicle and may transmit a control message to each control vehicle based on the determined avoidance control time point for the control vehicle.

For example, the control message may include at least one of the location of the emergency vehicle 10, the expected approach time of the emergency vehicle 10 to each control vehicle, an avoidance direction of the control vehicle, and lane change information of the control vehicle.

The emergency vehicle avoidance control apparatus 100 may be implemented as a server.

Hereinafter, the detailed configuration and the detailed operation of the emergency vehicle avoidance control apparatus 100 will be described with reference to FIG. 2.

Figure 2:
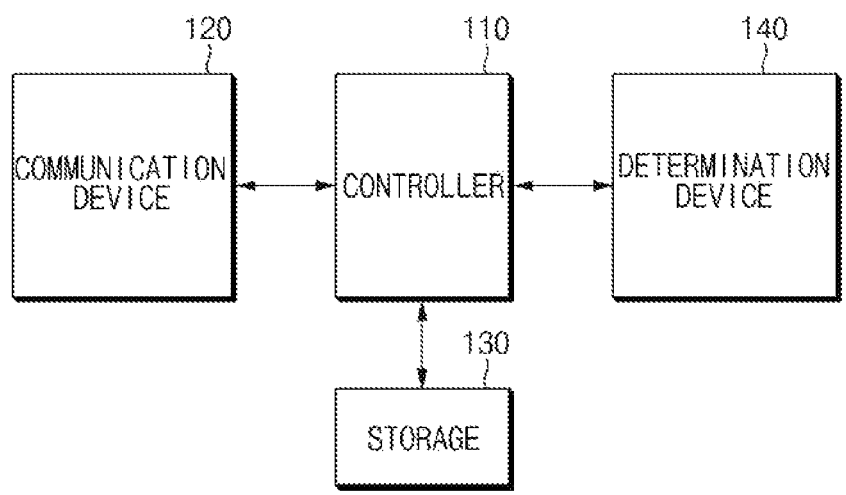
FIG. 2 is a view illustrating the configuration of the an apparatus for controlling the avoidance of the emergency vehicle, according to an embodiment of the present disclosure.

FIG. 2 is a view illustrating the configuration of the emergency vehicle avoidance control apparatus, according to an embodiment of the present disclosure.

Referring to FIG. 2, the emergency vehicle avoidance control apparatus 100 may include a controller 110, a communication device 120, a storage 130, and a determination device 140. In this case, according to the present embodiment, the controller 110 and the determination device 140 of the emergency vehicle avoidance control apparatus 100 may be implemented with at least one processor.

The communication device 120 may include a communication module to support a communication interface with the management server 50. For example, the communication module may receive the first traveling data from the management server 50 in real time or in a specific cycle.

In addition, the communication device 120 may include a communication module to support a communication interface with a plurality of vehicles 20. The communication module may receive the second traveling data from the vehicles 20 traveling in a specific section on the expected traveling path of the emergency vehicle 10 in real time or in a specific cycle.

In this case, the communication module may include a module for wireless Internet access or a module for short range communication.

The wireless Internet technology may include a wireless LAN (MLAN), a wireless broadband (Wibro), a Wi-Fi, World Interoperability for Microwave Access (Wimax). The short-range communication technology may include Bluetooth, ZigBee, ultra wideband (UWB), radio frequency identification (RFID), or infrared data association (IrDA).

The storage 130 may store data and/or algorithms necessary for the emergency vehicle avoidance control apparatus 100 to operate.

For example, the storage 130 may store the first traveling data and the second traveling data received through the communication device 120. In this case, the first traveling data and the second traveling data may be updated in real time or in a specific cycle.

In addition, the storage 130 may determine one or more control vehicles, calculates an expected approach time of the emergency vehicle 10 to each control vehicle, may determine the avoidance control time point for each control vehicle, and may store a command and/or an algorithm to generate a control message for each vehicle.

In this case, the storage 130 may include a storage medium, such as a random access memory (RAM), a static random access memory (SRAM), a read only memory (ROM), a programmable read-only memory (PROM), an electrically erasable programmable read-memory, or the like.

The determination device 140 determines the current location, the traveling lane, and the expected traveling path of the emergency vehicle 10 from the first traveling data when the first traveling data is received through the communication device 120. In this case, the controller 110 may request vehicles, which travel in a specific section on the expected traveling path, to transmit second traveling data through the communication device 120.

The determination device 140 may identify the location of each vehicle 20 based on the received second traveling data of the vehicle 20, when the second traveling data is received from the vehicle 20, and may determine at least one control vehicle based on the identified location of each vehicle 20.

In this case, the determination device 140 may compare the locations of the emergency vehicle 10 and each vehicle 20 on traveling lanes with each other and may determine, as the control vehicle, a vehicle located on the same lane as the lane of the emergency vehicle 10.

The determination device 140 may compare the location of the emergency vehicle 10 and the location of each vehicle 20 with each other and may determine, as the control vehicle, a vehicle located in a rotation direction of the emergency vehicle 10.

In addition, the determination device 140 may identify the location and the expected traveling path of each vehicle 20 and may determine, as the control vehicle, a vehicle, the lane of which is to be changed to the traveling lane of the emergency vehicle 10.

The controller 110 calculates the expected approach time of the emergency vehicle 10 to each control vehicle, when at one control vehicle is determined by the determination device 140. In this case, the controller 110 may calculate the expected approach time of the emergency vehicle 10 to each control vehicle based on the distance between the emergency vehicle 10 and each control vehicle and the speed of the emergency vehicle 10.

Meanwhile, the controller 110 may calculate the expected approach time of the emergency vehicle 10 to each control vehicle, based on the distance between the emergency vehicle 10 and each control vehicle and the maximum speed limit on a relevant lane. In this case, the controller 110 may calculate the expected approach time of the emergency vehicle 10 to each control vehicle, based on the number of vehicles located between the control vehicle and the emergency vehicle 10.

For example, the controller 110 may calculate the expected approach time of the emergency vehicle 10 to each control vehicle through following Equation 1.

$$T_j = \frac{D_j}{V} + (\alpha \times N) \qquad \text{Equation 1}$$

In Equation 1, $T_j$ denotes the expected approach time of the emergency vehicle 10 to a control vehicle (j), $D_j$ denotes the distance between the emergency vehicle 10 and the control vehicle (j), V denotes the speed of the emergency vehicle 10 or the maximum speed limit on a relevant lane, and $\alpha$ denotes an arbitrary coefficient.

The controller 110 may determine an avoidance control time point of each control vehicle based on the expected approach time of the emergency vehicle 10 to the control vehicle.

For example, the controller 110 may determine, as a first avoidance control time point, a time point at which the expected approach time of the emergency vehicle 10 to each control vehicle exceeds a first time, for example, 15 seconds. In addition, the controller 110 may determine, as a second avoidance control time point, a time point at which the expected approach time of the emergency vehicle 10 to each control vehicle becomes the first time, for example, 15 seconds. In addition, the controller 110 may determine, as a third avoidance control time point, a time point at which the expected approach time of the emergency vehicle 10 to each control vehicle becomes a second time, for example, 8 seconds.

The controller 110 transmits a control message to each control vehicle based on an avoidance control time point of the control vehicle. For example, the control message may include at least one of the location of the emergency vehicle 10, the expected approach time of the emergency vehicle 10 to each control vehicle, an avoidance direction of the control vehicle, and lane change information of the control vehicle.

Figure 3:
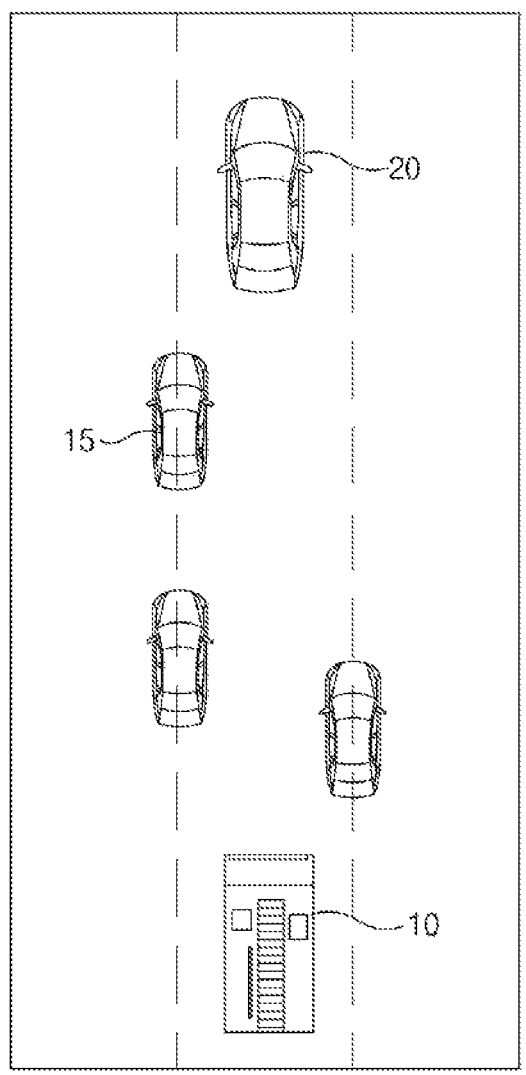
FIGS. 3 to 4G are views illustrating the implementation of a control message, according to an embodiment of the present disclosure.

For example, the control message includes an image or an emoticon for informing the emergency vehicle 10, a relevant control vehicle, and vehicles 20 traveling between the control vehicle and the emergency vehicle 10 as in the embodiment of FIG. 3.

In this case, the controller 110 may generate and transmit a control message step by step depending on each avoidance control time point.

For example, when the expected approach time of the emergency vehicle 10 to each control vehicle corresponds to the first avoidance control time point, the controller 110 may generate a warning message for informing the approach state of the emergency vehicle 10. The embodiment thereof will be described below with reference to FIG. 4A.

Alternatively, when the expected approach time of the emergency vehicle 10 to each control vehicle corresponds to a second avoidance control time point, the controller 110 may generate a warning message for informing the close state of the emergency vehicle 10 and the avoidance traveling. The embodiments thereof will be described below with reference to FIGS. 4B, 4C, 4E, 4F, and 4G.

Alternatively, when the expected approach time of the emergency vehicle 10 to each control vehicle corresponds to a third avoidance control time point, the controller 110 may generate a warning message for informing the significantly close state of the emergency vehicle 10 and the avoidance traveling. The embodiment thereof will be described below with reference to FIG. 4D.

Meanwhile, the controller 110 may determine the avoidance direction of each control vehicle and whether to change the lane of the control vehicle based on the second traveling data of each vehicle 20.

The controller 110 may determine the avoidance direction of each control vehicle based on the rotation direction or the movement direction of the emergency vehicle 10. For example, when the emergency vehicle 10 is planned to make a left turn, the controller 110 may determine the avoidance direction such that the control vehicle is moved to the right or may determine the control vehicle to move to remaining lanes other than a first lane. In addition, when the emergency vehicle 10 is planned to make a right turn, the controller 110 may determine the avoidance direction such that the control vehicle is moved to the left or may determine the control vehicle to move to on remaining lanes other than the rightmost lane. In addition, when the lane of the emergency vehicle 10 is planned to be changed to the left lane or the right lane, the controller 110 may determine the avoidance direction such that each control vehicle is moved in a direction opposite to the movement direction of the emergency vehicle 10.

The controller 110 may determine whether to change the lane of each control vehicle, based on the congestion state of a road. In this case, when road traffic is light, for example, when the traveling speed of each control vehicle is equal to or greater than the reference speed, the controller 110 may make determination to change the traveling lane of each control vehicle.

Meanwhile, when the road is in the congestion situation, for example, when the traveling speed of each control vehicle is less than the reference speed, the controller 110 may make determination to allow the control vehicle to move within the traveling lane. In this case, the controller 110 may determine the lane, which is to be changed, of each control vehicle based on the locations of vehicles traveling between the control vehicle and the emergency vehicle 10. In this case, the controller 110 may determine the lane, which is to be changed, of each control vehicle by uniformly distributing vehicles to the left side/right side such that the vehicles are not congested in one side.

Accordingly, the controller 110 may generate a control message for each control vehicle based on the determined avoidance direction and the determination of whether the lane is changed, and may transmit the generated control message to the control vehicle at an avoidance control time point of the control vehicle.

According to the present embodiment, the emergency vehicle avoidance control apparatus 100 having the above operation may be implemented in the form of an independent hardware device including a memory and a processor to process each operation, and may be run in the form included in another hardware device such as a microprocessor or a general purpose computer system.

FIGS. 4A to 4G are views illustrating various embodiments of a control message, according to an embodiment of the present disclosure.

Figure 4A:
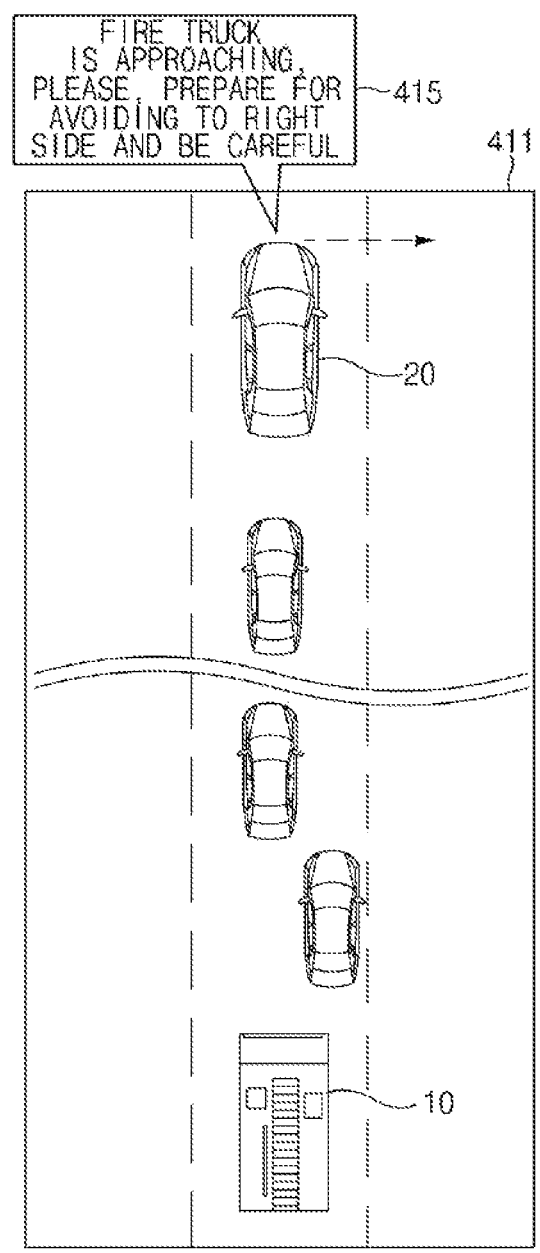

FIG. 4A illustrates a control message generated when the expected approach time of the emergency vehicle 10 to the control vehicle 20 corresponds to the first avoidance control time point.

Referring to FIG. 4A, the control message may include images or emoticons for representing the states of the emergency vehicle 10 and the control vehicle 20, and an emoticon for informing the avoidance direction of the control vehicle 20, as illustrated in reference number 411. In this case, since the expected approach time, which corresponds to the first avoidance control time point, of the emergency vehicle 10 is sufficiently left, the control message may include words of informing the avoidance direction while warning the close state of the emergence vehicle 10 as in reference number 415.

Figure 4B:
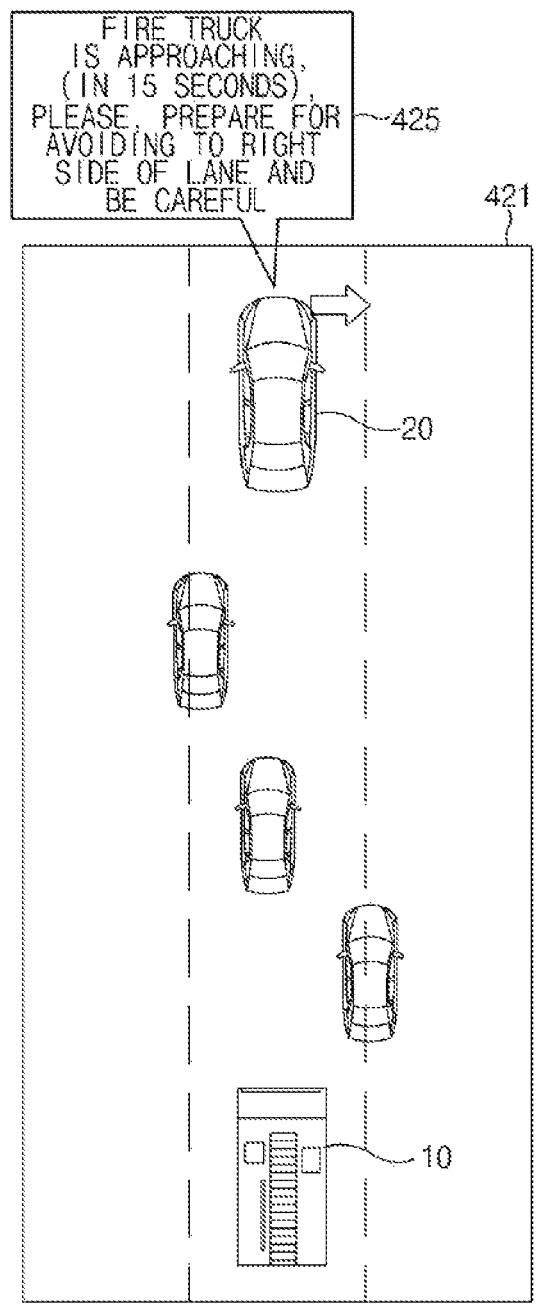

FIG. 4B illustrates a control message generated when the expected approach time of the emergency vehicle 10 to the control vehicle 20 corresponds to the second avoidance control time point while the traffic of the lane is congested.

Referring to FIG. 4B, the control message may include images or emoticons for representing the states of the emergency vehicle 10 and the control vehicle 20, and an emoticon for informing the avoidance direction of the control message 20, as illustrated in reference number 421. In this case, since the expected approach time, which corresponds to the second avoidance control time point, of the emergency vehicle 10 is about 15 seconds and rarely left, the control message may include words of informing the movement to the left lane as in reference number 425.

Figure 4C:
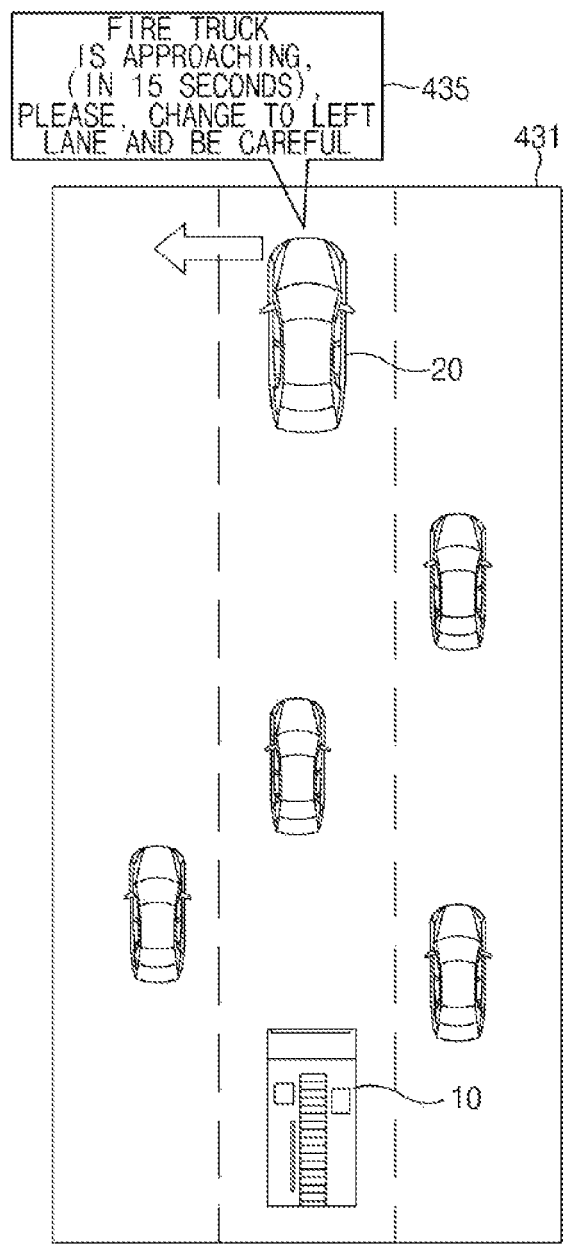

FIG. 4C illustrates a control message generated when the expected approach time of the emergency vehicle 10 to the control vehicle 20 corresponds to the second avoidance control time point while the road traffic is light.

Referring to FIG. 4C, the control message may include images or emoticons for representing the states of the emergency vehicle 10 and the control vehicle 20, and an emoticon for informing the avoidance direction of the control message 20, as illustrated in reference number 431. In this case, since the expected approach time, which corresponds to the second avoidance control time point, of the emergency vehicle 10 is about 15 seconds and rarely left, the control message may include words of informing the movement to a right lane as in reference number 435.

Figure 4D:
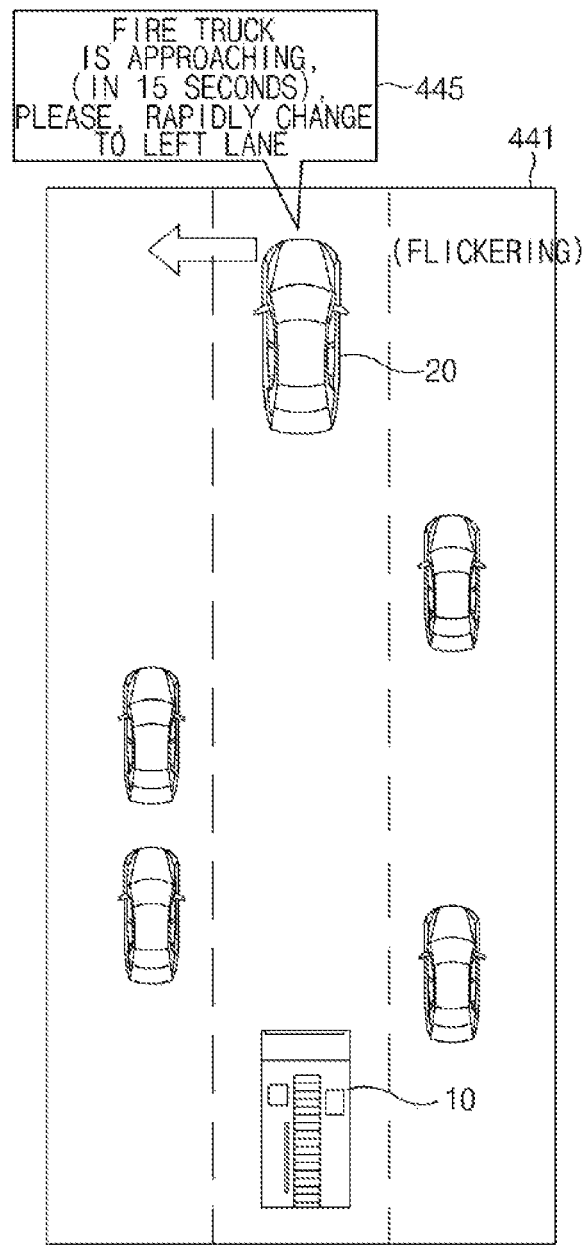

FIG. 4D illustrates a control message generated when the expected approach time of the emergency vehicle 10 to the control vehicle 20 corresponds to the third avoidance control time point while the road traffic is light.

Referring to FIG. 4D, the control message may include images or emoticons for representing the states of the emergency vehicle 10 and the control vehicle 20, and an emoticon for informing the avoidance direction of the control message 20, as illustrated in reference number 441. In this case, since the expected approach time, which corresponds to the third avoidance control time point, of the emergency vehicle 10 is about 8 seconds so the emergency vehicle 10 is significantly close to the control vehicle 20, the control message may include words of informing the rapid movement to a left lane as in reference number 445. In this case, the emergency vehicle avoidance control apparatus 100 may transmit, to the relevant control vehicle 20, control data for controlling a flickering lamp together with the control message.

Figure 4E:
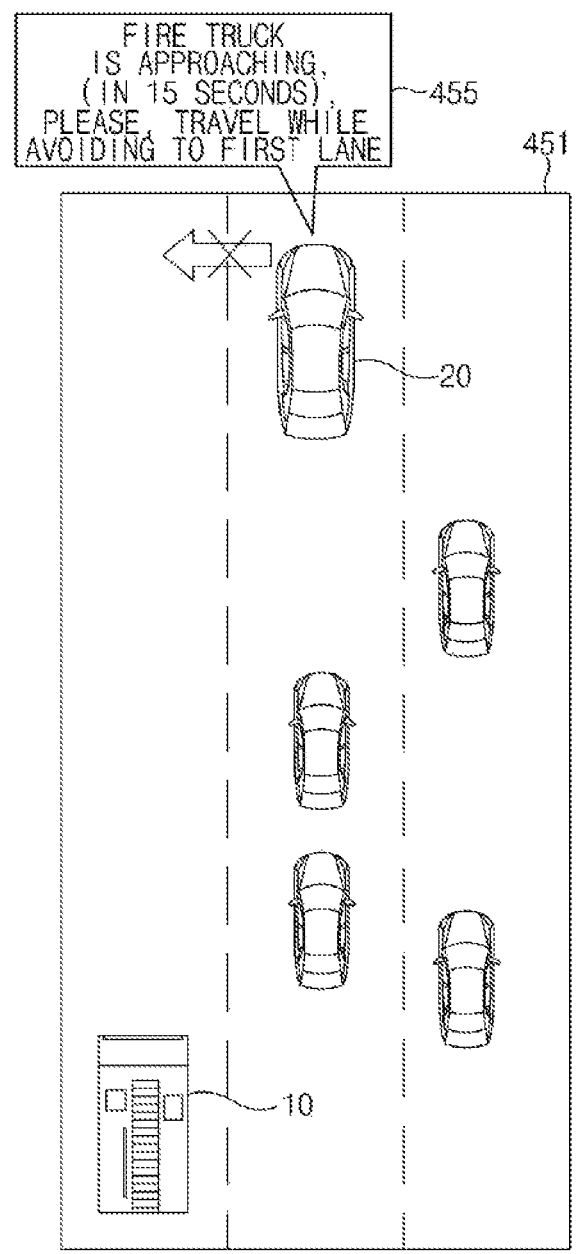

FIG. 4E illustrates a control message generated when the expected approach time of the emergency vehicle 10 to the control vehicle 20 corresponds to the second avoidance control time point while the emergency vehicle 10 is planned to make a left turn.

Referring to FIG. 4E, the control message may include images or emoticons for representing the states of the emergency vehicle 10 and the control vehicle 20, and an emoticon for informing the avoidance direction of the control vehicle 20, as illustrated in reference number 451. In this case, the control message may include words of informing the expected approach time of the emergency vehicle 10 and of informing that the control vehicle 20 travels while avoiding the first lane, as illustrated in reference number 455.

Figure 4F:
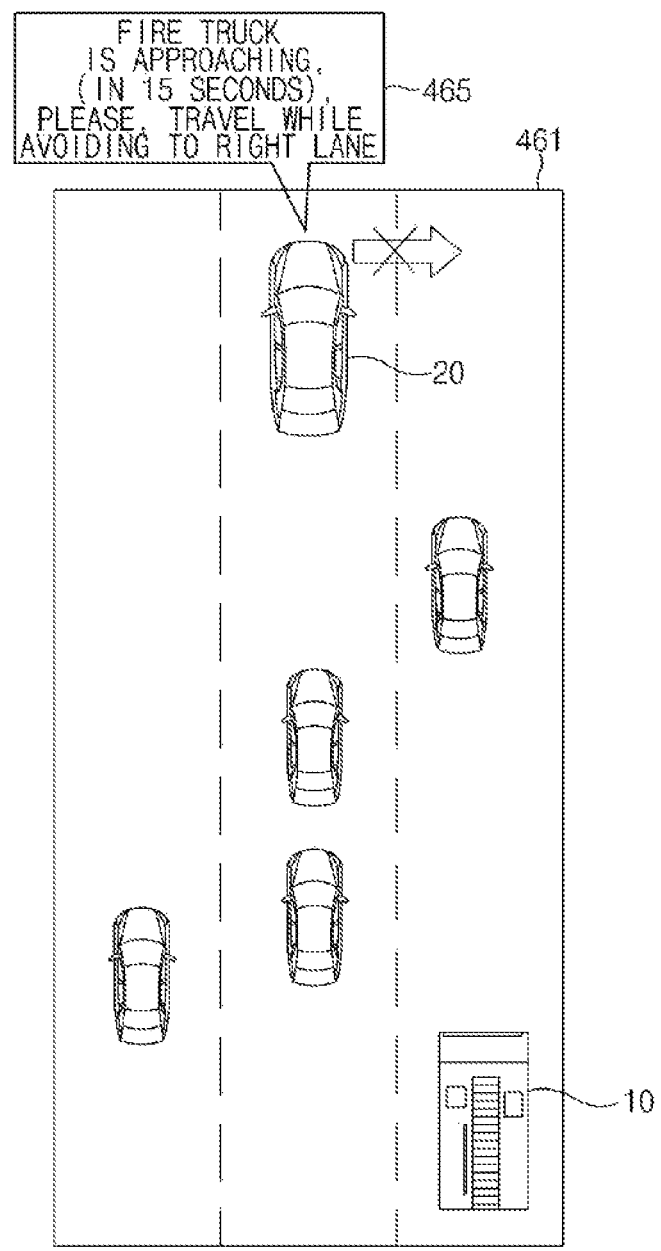

FIG. 4F illustrates a control message generated when the expected approach time of the emergency vehicle 10 to the control vehicle 20 corresponds to the second avoidance control time point while the emergency vehicle 10 is planned to make a right turn.

Referring to FIG. 4F, the control message may include images or emoticons for representing the states of the emergency vehicle 10 and the control vehicle 20, and an emoticon for informing the avoidance direction of the control message 20, as illustrated in reference number 461. In this case, the control message may include words of informing the expected approach time of the emergency vehicle 10 and of informing that the control vehicle 20 travels while avoiding a right edge lane, as illustrated in reference number 465.

Figure 4G:
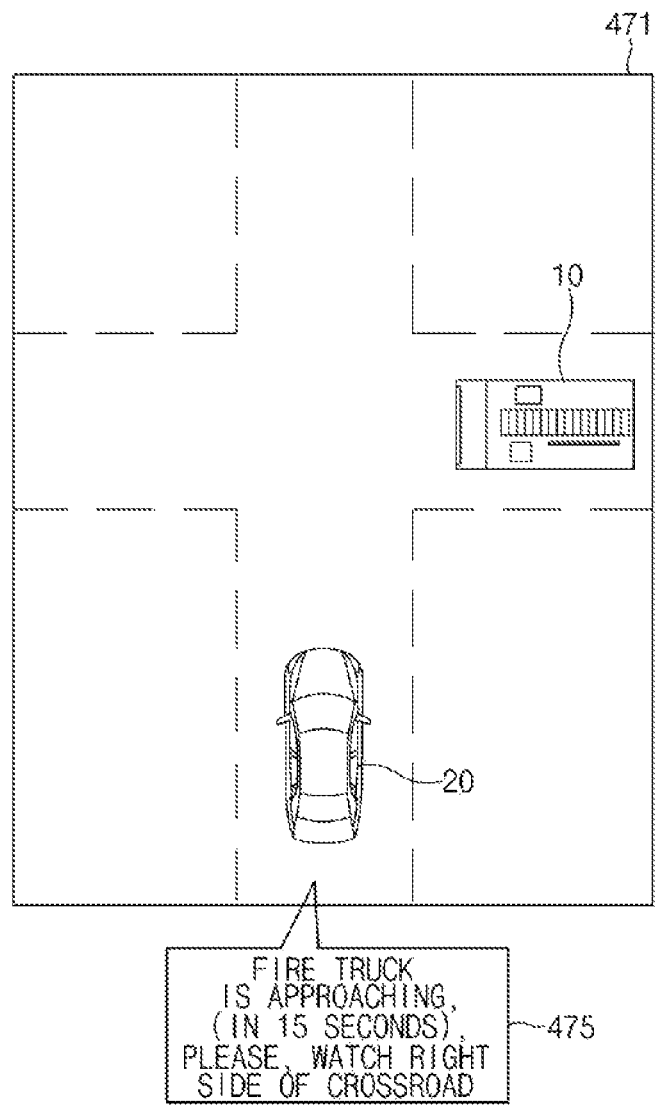

FIG. 4G illustrates a control message generated when the expected approach time of the emergency vehicle 10 to the control vehicle 20 corresponds to the second avoidance control time point while the emergency vehicle 10 is waiting on the front crossroad.

Referring to FIG. 4G, the control message may include images or emoticons for representing the states of the emergency vehicle 10 and the control vehicle 20, and an emoticon for informing the avoidance direction of the control message 20, as illustrated in reference number 471. In this case, the control message may include words of informing the expected approach time of the emergency vehicle 10 and of informing the location of the emergency vehicle 10 within the crossroad, as illustrated in reference number 475.

Hereinafter, the operation flow of the vehicle system having the above configuration will be described in more detail according to the present disclosure.

Figure 5:
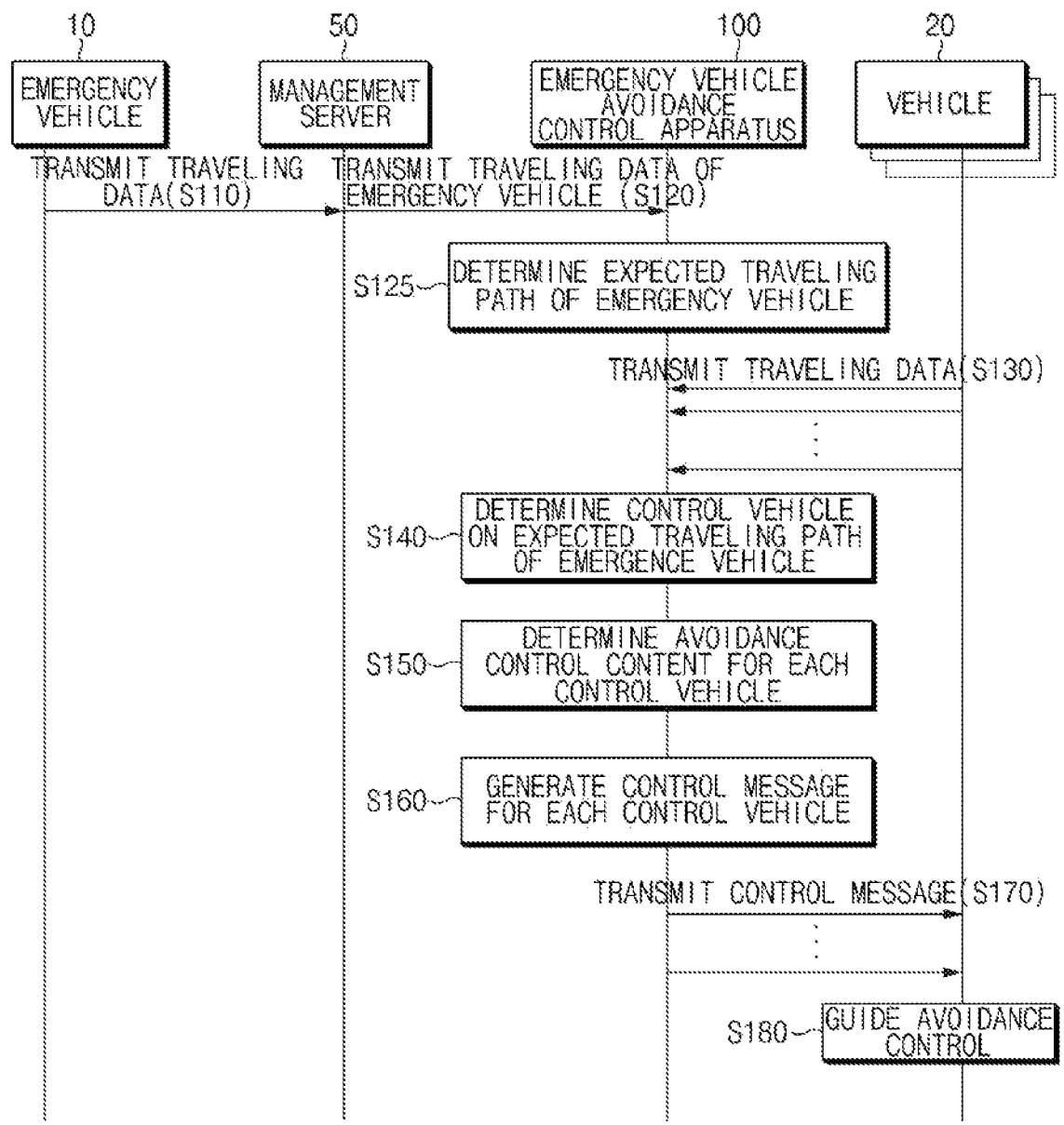
FIG. 5 and FIG. 6 are views illustrating the operation flow of a method for controlling the avoidance of the emergence vehicle, according to an embodiment of the present disclosure.
Figure 6:
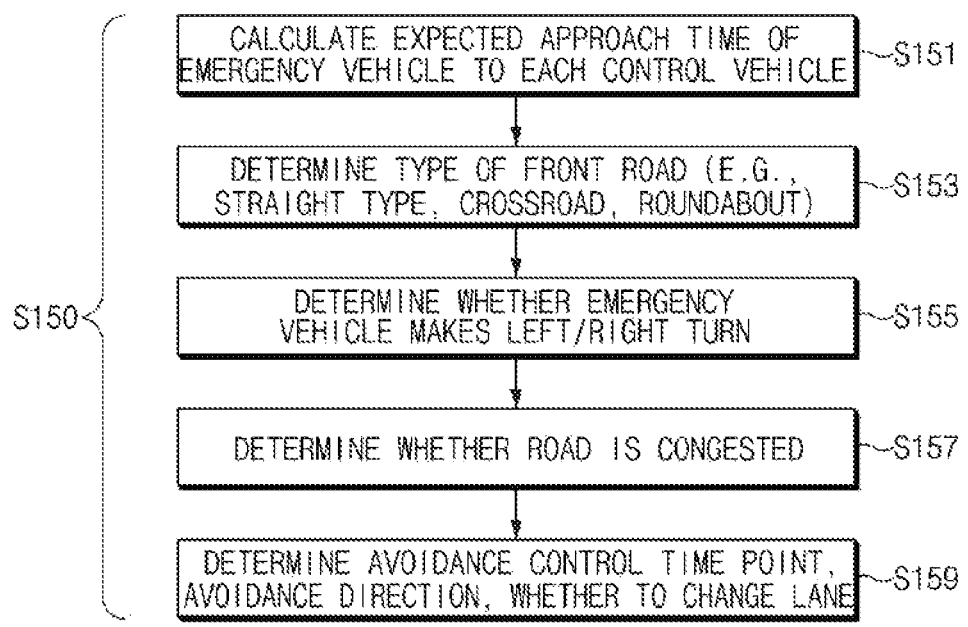

FIG. 5 and FIG. 6 are views illustrating the operation flow of a method for controlling the avoidance of the emergence vehicle in the vehicle system, according to an embodiment of the present disclosure.

Referring to FIG. 5, the emergency vehicle 10 transmits traveling data to the management server 50 in real time or in a specific cycle (S110). In this case, the management server 50 may transmit the traveling data, which is received from the emergency vehicle 10, to the emergency vehicle avoidance control apparatus 100 in real time or in a specific cycle (S120).

The emergency vehicle avoidance control apparatus 100 determines an expected traveling path based on the traveling data received from the emergency vehicle 10 in operation S120 (S125) and receives traveling data from vehicles traveling in a specific section on the expected traveling path of the emergency vehicle 10 (S130).

The emergency vehicle avoidance control apparatus 100 determines a control vehicle, which is to be subject to avoidance control, among vehicles traveling in the specific section on the expected traveling path of the emergency vehicle 10, based on the received traveling data in operation S120 and operation S130 (S140).

Thereafter, the emergency vehicle avoidance control apparatus 100 determines avoidance control content including an avoidance control time point of each control vehicle, an avoidance direction of the control vehicle, and whether to change the lane of the control vehicle (S150).

As illustrated in FIG. 6, in operation S150, the emergency vehicle avoidance control apparatus 100 calculates an expected approach time of the emergency vehicle 10 to each control vehicle (S151). In addition, the emergency vehicle avoidance control apparatus 100 determines whether the front lane type is a straight type, an intersection type, or a roundabout (S153), and determines whether the emergency vehicle 10 makes a left turn or a right turn from the expected traveling path (S155). In addition, the emergency vehicle avoidance control apparatus 100 determines whether road traffic is congested (S157).

The emergency vehicle avoidance control apparatus 100 may determine the avoidance control time point based on the calculation result in operation S151 and may determine the avoidance direction and whether the lane is changed, based on the determination results in operation S153 to operation S157 (S159).

The emergency vehicle avoidance control apparatus 100 generates a control message for each control vehicle based on the avoidance control content determined in operation S150 (S160) and transmits the control message to the control vehicle (S170).

Accordingly, each control vehicle outputs a guide for avoiding the emergency vehicle 10, based on the control message received from the emergency vehicle avoidance control apparatus 100 (S180).

Figure 7:
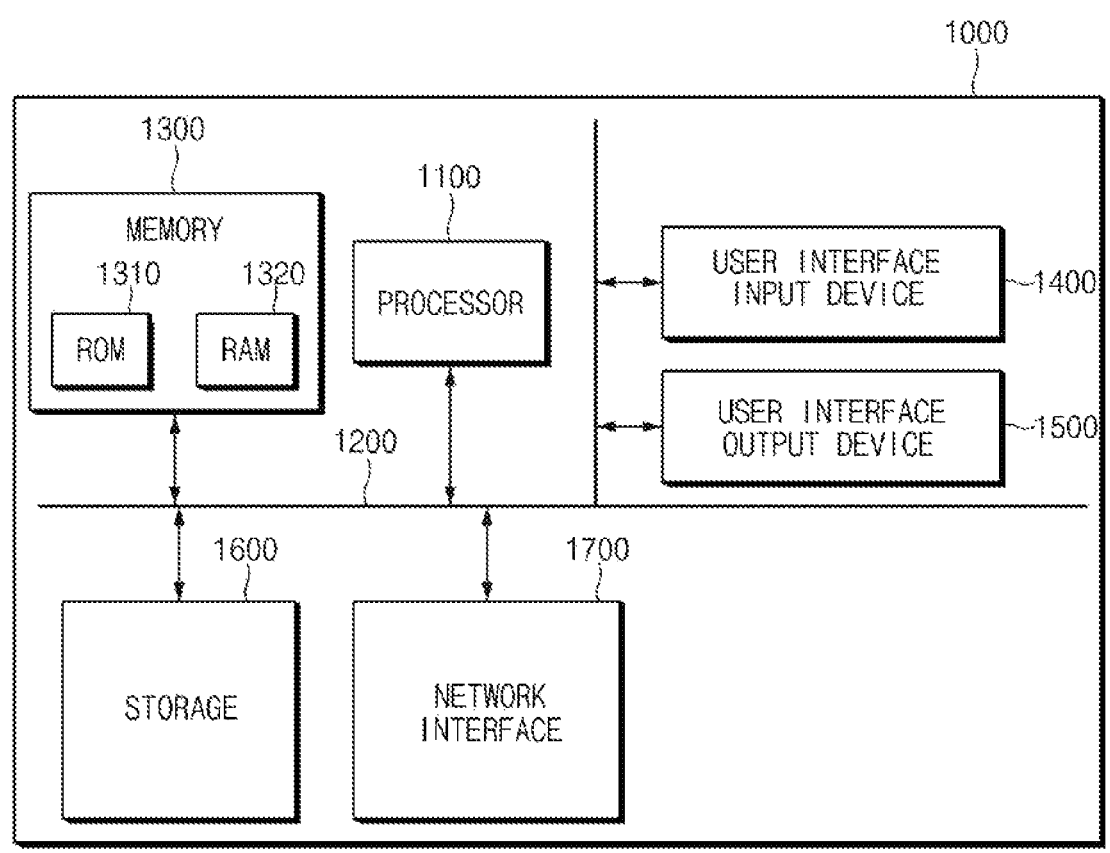
FIG. 7 is a block diagram illustrating a computing system to execute the method according to an embodiment of the present disclosure.

FIG. 7 is a block diagram illustrating a computing system to execute the method according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM, see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, the avoidance control time point and the avoidance direction may be determined through wireless communication with vehicles positioned on a traveling path of the emergency vehicle to perform the avoidance control based on the avoidance control time point and the avoidance direction before the emergency vehicle approaches, thereby rapidly ensuring the movement path of the emergency vehicle.

In addition, according to the present disclosure, the avoidance control time point and the avoidance direction are determined based on an expected approach time of the emergency vehicle to each vehicle, a rotation direction of the emergency vehicle, and a road situation to perform the avoidance control for each vehicle, thereby effectively controlling the avoidance of the emergency vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for controlling avoidance for an emergency vehicle, the apparatus comprising:
   a communication device to receive traveling data from vehicles traveling in a specific section on an expected traveling path of the emergency vehicle;
   a determination device to identify locations of the vehicles from the received traveling data and to determine at least one control vehicle based on the identified locations of the vehicles; and a controller to determine an avoidance control time point of each control vehicle based on an expected approach time of the emergency vehicle to the control vehicle, and to transmit a control message to the control vehicle based on the avoidance control time point of the control vehicle,
   wherein the controller:
   determines whether to change a lane of the control vehicle; and
   generates the control message for the control vehicle, based on the determination of whether to change the lane of the control vehicle,
   wherein the controller:
   determines to change a traveling lane of the control vehicle when a traveling speed of the control vehicle is a reference speed Or more; and
   determines to move the control vehicle within the traveling lane when the traveling speed of the control vehicle is less than the reference speed.

2. The apparatus of claim 1, wherein the determination device determines, as the control vehicle, a vehicle on the same lane as a lane of the emergency vehicle by comparing a traveling lane location of the emergency vehicle with a traveling lane location of each vehicle.

3. The apparatus of claim 1, wherein the determination device determines, as the control vehicle, a vehicle located in a rotation direction of the emergency vehicle by comparing a location of the emergency vehicle with a location of the respective vehicles.

4. The apparatus of claim 1, wherein the determination device determines, as the control vehicle, a vehicle, a traveling lane of which is to be changed to a traveling lane of the emergency vehicle, by determining a location and an expected traveling path of each vehicle.

5. The apparatus of claim 1, wherein the controller calculates the expected approach time of the emergency vehicle to the control vehicle, based on a distance between the emergency vehicle and the control vehicle, a speed of the emergency vehicle, or the maximum speed limit of a relevant road.

6. The apparatus of claim 1, wherein the controller generates a control message for each step based on the expected approach time of the emergency vehicle.

7. The apparatus of claim 6, wherein the controller:
   generates an avoidance and warning message when the expected approach time of the emergency vehicle is less than a first time;
   generates an avoidance message when the expected approach time of the emergency vehicle is the first time or more and less than a second time; and
   generates a warning message when the expected approach time of the emergency vehicle is the second time or more.

8. The apparatus of claim 1, wherein the controller determines a lane, which is to be changed, of the control vehicle, based on locations of vehicles traveling between the control vehicle and the emergency vehicle, when the traveling speed of the control vehicle is the reference speed or more.

9. The apparatus of claim 1, wherein the control message includes:
   at least one of a location of the emergency vehicle, the expected approach time of the emergency vehicle to the control vehicle, an avoidance direction of the control vehicle, and lane change information of the control vehicle.

10. The apparatus of claim 1, wherein the communication device receives traveling data of the emergency vehicle from a management server which provides the traveling data of the emergency vehicle, and
wherein the determination device determines the expected traveling path of the emergency vehicle based on the traveling data of the emergency vehicle.

11. The apparatus of claim 1, wherein the controller:
determines an avoidance direction of the control vehicle; and
generates the control message for the control vehicle, based on the determined avoidance direction and the determination of whether to change the lane of the control vehicle.

12. The apparatus of claim 11, wherein the controller determines the avoidance direction of the control vehicle, based on the rotation direction or a movement direction of the emergency vehicle.

13. A method for controlling avoidance of an emergency vehicle, the method comprising:
receiving traveling data from vehicles traveling in a specific section on an expected traveling path of the emergency vehicle;
identifying locations of the vehicles from the received traveling data and determining at least one control vehicle based on the identified locations of the vehicles; and
determining an avoidance control time point of each control vehicle based on an expected approach time of the emergency vehicle to the control vehicle, and transmitting a control message to the control vehicle based on the avoidance control time point of the control vehicle,
wherein the transmitting of the control message includes:
determining whether to change a lane of the control vehicle; and
generating the control message for the control vehicle, based on the determination of whether to change the lane of the control vehicle,
wherein the determining of whether to change the lane of the control vehicle includes:
determining to change a traveling lane of the control vehicle when a traveling speed of the control vehicle is a reference speed or more; and
determining to move the control vehicle within the traveling lane when the traveling speed of the control vehicle is less than the reference speed.

14. The method of claim 13, wherein the determining of the at least one control vehicle includes:
determining, as the control vehicle, a vehicle on the same lane as a lane of the emergency vehicle by comparing a traveling lane location of the emergency vehicle with a traveling lane location of the vehicle.

15. The method of claim 13, wherein the determining of the at least one control vehicle includes:
determining, as the control vehicle, a vehicle located in a rotation direction of the emergency vehicle by comparing a location of the emergency vehicle with a location of the vehicle.

16. The method of claim 13, wherein the determining of the at least one control vehicle includes:
determining, as the control vehicle, a vehicle, a traveling lane of which is to be changed to a traveling lane of the emergency vehicle, by determining a location and the expected traveling path of each vehicle.

17. The method of claim 13, further comprising:
calculating an expected approach time of the emergency vehicle to the control vehicle, based on a distance between the emergency vehicle and the control vehicle, a speed of the emergency vehicle, or the maximum speed limit of a relevant road.

18. The method of claim 17, wherein the transmitting of the control message includes:
generating a control message for each step based on the expected approach time of the emergency vehicle.

19. The method of claim 13, wherein the transmitting of the control message includes:
determining an avoidance direction of the control vehicle, based on a rotation direction or a movement direction of the emergency vehicle; and
generating the control message for the control vehicle, based on the determined avoidance direction and the determination of whether to change the lane of the control vehicle.

20. The method of claim 13, wherein the determining of whether to change the lane of the control vehicle includes:
determining a lane, which is to be changed, of the control vehicle, based on locations of vehicles traveling between the control vehicle and the emergency vehicle, when the traveling speed of the control vehicle is the reference speed or more.

21. The method of claim 13, further comprising:
receiving traveling data of the emergency vehicle from a management server which provides the traveling data of the emergency vehicle, and
determining the expected traveling path of the emergency vehicle based on the received traveling data of the emergency vehicle.

22. A vehicle system comprising:
an emergency vehicle;
a management server to provide traveling data of the emergency vehicle;
vehicles traveling in a specific section on an expected traveling path of the emergency vehicle; and
an emergency vehicle avoidance control apparatus:
to determine at least one control vehicle based on locations of the vehicles which are identified based on traveling data of the vehicles;
to determine an avoidance control time point of each control vehicle based on an expected approach time of the emergency vehicle to the control vehicle; and
to transmit a control message to the control vehicle based on the determined avoidance control time point of the control vehicle.

* * * * *